(12) United States Patent
Tsuchie et al.

(10) Patent No.: US 7,857,553 B2
(45) Date of Patent: Dec. 28, 2010

(54) TRANSFER PIPE OF DRIED CONCENTRATE AND BREAKAGE DETECTING METHOD OF TRANSFER PIPE

(75) Inventors: Yasuhiro Tsuchie, Okayama (JP); Masakazu Ohno, Okayama (JP); Kenji Miyamoto, Okayama (JP); Masahiro Wakayama, Okayama (JP)

(73) Assignee: Pan Pacific Copper Co., Ltd., Tokyo (JP)

( * ) Notice: Subject to any disclaimer, the term of this patent is extended or adjusted under 35 U.S.C. 154(b) by 0 days.

(21) Appl. No.: 12/235,642

(22) Filed: Sep. 23, 2008

(65) Prior Publication Data
US 2009/0084457 A1    Apr. 2, 2009

(30) Foreign Application Priority Data
Sep. 28, 2007    (JP) .............................. 2007-256659

(51) Int. Cl.
*B65G 51/18* (2006.01)
(52) U.S. Cl. .................. 406/193; 138/104; 138/114; 138/143; 138/148; 406/34; 75/378; 75/10.62
(58) Field of Classification Search ................ 138/104, 138/109, 114, 143, 148; 75/378, 379, 10.62; 406/193, 34
See application file for complete search history.

(56) References Cited

U.S. PATENT DOCUMENTS

| | | | | | |
|---|---|---|---|---|---|
| 2,478,326 | A | * | 8/1949 | Scarth ........................ | 406/193 |
| 2,759,491 | A | * | 8/1956 | Everhart ...................... | 285/55 |
| 2,772,925 | A | * | 12/1956 | Dygert ........................ | 406/193 |
| 3,044,499 | A | * | 7/1962 | Frerich ........................ | 138/143 |
| 3,158,463 | A | * | 11/1964 | Petkovich et al. ............. | 75/760 |
| 3,693,665 | A | * | 9/1972 | Veerling et al. ............. | 138/149 |
| 3,830,173 | A | * | 8/1974 | Hubble et al. ................ | 138/114 |
| 4,055,681 | A | * | 10/1977 | Balaz et al. .................. | 426/656 |
| 4,093,193 | A | * | 6/1978 | Cassidy et al. ................. | 266/87 |
| 4,116,491 | A | * | 9/1978 | Ply ............................. | 406/89 |
| 4,142,556 | A | * | 3/1979 | Pignocco et al. ............. | 138/146 |
| 4,151,828 | A | * | 5/1979 | Mather et al. ................ | 126/652 |
| 4,413,816 | A | * | 11/1983 | Makipirtti et al. ........... | 266/270 |

(Continued)

FOREIGN PATENT DOCUMENTS

JP    58-19531 A    2/1983

(Continued)

*Primary Examiner*—James F Hook
(74) *Attorney, Agent, or Firm*—Panitch Schwarze Belisario & Nadel LLP

(57) ABSTRACT

A transfer pipe of dried concentrate for transferring dried concentrate, having a double pipe structure, comprising an inner pipe 2 through which the dried concentrate is transferred by compressed air, an outer pipe 3 arranged around the outer periphery of the inner pipe 2, and a joint flange 5 forming an annular space 4 sealed between the inner pipe 2 and the outer pipe 3, arranged at both ends of the inner pipe 2 and the outer pipe 3, and integrally fixing the inner pipe 2 and the outer pipe 3; wherein the inner pipe 2 is positioned inside the outer pipe 3 and is formed of a metal pipe 2a forming the annular space 4, a ceramic sleeve 2c forming an innermost layer of the metal pipe, and a filler 2b for fixing the ceramic sleeve 2c provided between the metal pipe 2a and the ceramic sleeve 2c.

2 Claims, 5 Drawing Sheets

U.S. PATENT DOCUMENTS

| | | | |
|---|---|---|---|
| 4,936,715 A * | 6/1990 | Wolf et al. | 406/14 |
| 4,995,427 A * | 2/1991 | Berchem | 138/155 |
| 5,024,289 A * | 6/1991 | Merry | 181/231 |
| 5,097,871 A * | 3/1992 | Ohta | 138/149 |
| 5,683,570 A * | 11/1997 | Pacey et al. | 205/784 |
| 5,690,806 A * | 11/1997 | Sunderland et al. | 205/560 |
| 6,082,392 A * | 7/2000 | Watkins, Jr. | 137/312 |
| 6,227,768 B1 * | 5/2001 | Higuchi et al. | 406/89 |
| 6,682,584 B2 * | 1/2004 | Pozarnsky et al. | 75/332 |
| 7,776,133 B2 * | 8/2010 | Nakagawa et al. | 75/585 |
| 2007/0175299 A1 * | 8/2007 | Hughes et al. | 75/643 |

FOREIGN PATENT DOCUMENTS

| | | |
|---|---|---|
| JP | 6184564 A | 7/1994 |
| JP | 6249393 A | 9/1994 |
| JP | 2003065944 A | 3/2003 |

\* cited by examiner

TRANSFER PIPE OF DRIED CONCENTRATE AND BREAKAGE DETECTING METHOD OF TRANSFER PIPE

BACKGROUND OF THE INVENTION

1. Field of the Invention

The present invention relates to a structure of a transfer pipe for transferring dried concentrate by compressed air and relates also to a breakage detecting method applicable upon breakage of the transfer pipe having such structure by wearing caused by dried concentrate.

2. Description of the Related Art

Concentrate available through concentration is conventionally dried by heat for the purpose of saving heat energy in the ore refining process, and facilitating such handling as feeding of ore to the furnace and conveyance thereof, and preventing a decrease in reactivity caused by moisture. Particularly in the case of a flash smelting furnace, strict drying is applied.

A concentrate drying facility for drying copper concentrate to be fed to a flash smelting furnace in a copper smelting plant has a flash drier and a steam drier. FIG. 1 illustrates a steam drier side drying equipment 100 having a steam drier 105 forming a part of the concentrate drying facility.

As shown in FIG. 1, copper concentrate S is distributed by a distributor 101 to a flash drier side drying equipment 100A and a steam drier side drying equipment 100. Description of details of the concentrate drying equipment 100A on the flash drier side is omitted here.

Concentrate S distributed to the steam drier side drying equipment 100 is conveyed while being weighted on a steam drier feed conveyor 102. Concentrate from the steam drier feed conveyor 102 takes out coarse concentrate through a shaking screen 103 to outside the system.

Concentrate S having a prescribed size screened by the shaking screen is charged into a steam drier 105 on a shaking feeder 104.

In the steam drier 105, the concentrate S is dried by use of steam generated in a waste heat boiler of the flash smelting furnace. The dried concentrate S is discharged from the steam drier 105 by operating a rotary valve 106. On the other hand, steam produced upon drying the concentrate S is subjected to dust removal by a bag filter 107, and released to the open air via an exhaust fan 107a and a stack 107b.

The concentrate S dust-collected by the bag filter 107 is conveyed by a screw conveyor 108 and discharged from the bag filter 107.

The concentrate S discharged from the steam drier 105 and the bag filter 107 is then sent to a service hopper 110 of an air transfer equipment by an eprobator 109. Then, the concentrate S is sent from the service hopper 110 to a lift tank 111.

The lift tank 111 into which the concentrate S has been charged is then tightly closed, and fed with compressed air from a compressor 112 to pressurize the interior of the lift tank 111. Air compressed by the compressor 112 is sent through a drier 113 and a super-line filter 114, retained in a receiver tank 115 and then supplied to the lift tank 111. Then, the interior of the lift tank 111 is pressurized.

Subsequently, the concentrate S is air-transferred to an existing dried ore hopper 200 through the transfer pipe 117, together with compressed air by opening an air-transfer valve 116 installed on the lift tank 111. The thus air-transferred concentrate S through the transfer pipe 117 is collected in a dust chamber 118 and a bag filter 119 installed before a dried ore hopper 200, dust-collected, and sent to a dried ore hopper 200.

The concentrate S dried at the steam drier 105 and collected in a dried ore hopper 200 as described above is then fed to the flash smelting furnace 201 via an LI feeder which is a concentrate feeder.

Conventionally, the transfer pipe is a straight pipe or a bending pipe, and is usually a steel pipe. As required, a wear-resistant ceramic hose is used as a bending pipe.

As described above, the dried copper concentrate S is transferred by compressed air through the transfer pipe 117, and the dried copper concentrate causes wear of the interior of the transfer pipe 117, may spout and splash in the open air. Occurrence of such a trouble causes problems in operation as well as in environments.

The present inventors therefore improved the structure of the transfer pipe 117, and made development efforts of warning means for a case where the transfer pipe 117 is broken by any chance.

For example, Japanese Patent Application Laid-Open No. 58-19531 discloses a double pipe breakage detecting method in a double pipe used as a pipeline for transporting fluid such as petroleum.

This double pipe breakage detecting method comprises dividing an annular space formed by an inner cylinder and an outer cylinder into a plurality of spaces, and filling the thus divided annular space with a liquid (water). When the inner cylinder is broken, the steps include causing the pressurized transporting liquid in the inner cylinder flow into the annular space, increasing the pressure in the annular space, pressurizing the water in the annular space to raise the liquid level in a liquid level monitoring drum, and activating an alarming device. When the outer cylinder is broken, causing water in the annular space to flow out, causing water in the liquid level monitoring drum to flow into the annular space, lowering the liquid level in the liquid level monitoring drum, and activating the alarming device.

In the double pipe breakage detecting method disclosed in the above-mentioned Japanese Patent Application Laid-Open No. 58-19531, the double pipe used itself is a pipeline prepared from a usual double pipe-structured steel pipe or the like.

Such a double pipe cannot be used as a transfer pipe 117 which transfers granular or powdery high-temperature dried concentrate by compressed air, not a liquid such as petroleum to be covered by the present invention. The double pipe breakage detecting method of filling an annular space formed by an inner cylinder and an outer cylinder composing the double pipe with a liquid such as water is not applicable as warning means of a transfer pipe 117 in a concentrate drying equipment 100 which transfers a high-temperature dried concentrate by compressed air, since, when the inner cylinder is broken by accident, the liquid such as water is mixed with the dried concentrate which absorbs water, thus exerting adverse effects such as adherent residue on the subsequent facilities.

SUMMARY OF THE INVENTION

Accordingly, it is an object of the present invention to provide a transfer pipe of dried concentrate, having a double pipe structure, making it possible to inhibit wearing caused by concentrate transferred by compressed air and improves durability.

It is another object of the present invention to provide a transfer pipe breakage detecting method upon breakage of a transfer pipe of dried concentrate which, even upon breakage of the inner pipe of the transfer pipe due to the dried concentrate of the aforementioned double pipe structure, can prevent breakage of the outer pipe, and prevent spouting and splashing of concentrate to external environments.

The aforementioned objects can be achieved by the transfer pipe of concentrate and the transfer pipe breakage detecting method upon breakage of the transfer pipe of the present invention. In summary, according to a first aspect of the present invention, there is provided a transfer pipe of dried concentrate for transferring dried concentrate, having a double pipe structure, comprising an inner pipe through which the dried concentrate is transferred by compressed air, an outer pipe arranged around the outer periphery of the inner pipe, and a joint flange forming an annular space sealed between the inner pipe and the outer pipe, arranged at both ends of the inner pipe and the outer pipe, and integrally fixing the inner pipe and the outer pipe;

wherein the inner pipe is formed of a metal pipe positioned inside the outer pipe and forming the annular space, a ceramic sleeve forming an innermost layer of the metal pipe, and a filler for fixing the ceramic sleeve provided between the metal pipe and the ceramic sleeve.

According to an embodiment of the present invention, pressure sensing means for detecting the pressure within the annular space is connected to the outer pipe.

According to a second aspect of the present invention, there is provided a transfer pipe breakage detecting method, which detects breakage of a transfer pipe which transfers dried concentrate by compressed air;

wherein the transfer pipe is the transfer pipe of the first aspect of the present invention which has a double pipe structure and in which pressure detecting means is connected to the outer pipe thereof;

the pressure detecting means measures the pressure in the annular space of the transfer pipe constantly, or periodically, or from time to time, and transmits the signal thereof to control means; and the control means issues an alarm when the pressure reaches a first prescribed pressure value, and discontinues transfer of the dried concentrate when the pressure reaches a second prescribed pressure value.

In the second aspect of the present invention, according to an embodiment, the compressed air has a pressure of 0.4 MPa, the first prescribed pressure value in the annular space, as detected by the pressure detecting means is 9.0 kPa, and the second prescribed pressure value is 9.5 kPa.

According to the present invention, ceramics is applied on the inner surface of the transfer pipe to improve wear resistance, thus permitting prevention of spouting of the piping caused by wearing by the dried concentrate. For example, even when spouting occurs in the inner pipe, splashing of concentrate to outside can be prevented.

DESCRIPTION OF THE PREFERRED EMBODIMENTS

The transfer pipe of dried concentrate and the transfer pipe breakage detecting method upon occurrence of breakage of the transfer pipe of dried concentrate of the present invention will now be described further in detail with reference to the drawings.

Embodiment 1

Figure 1:
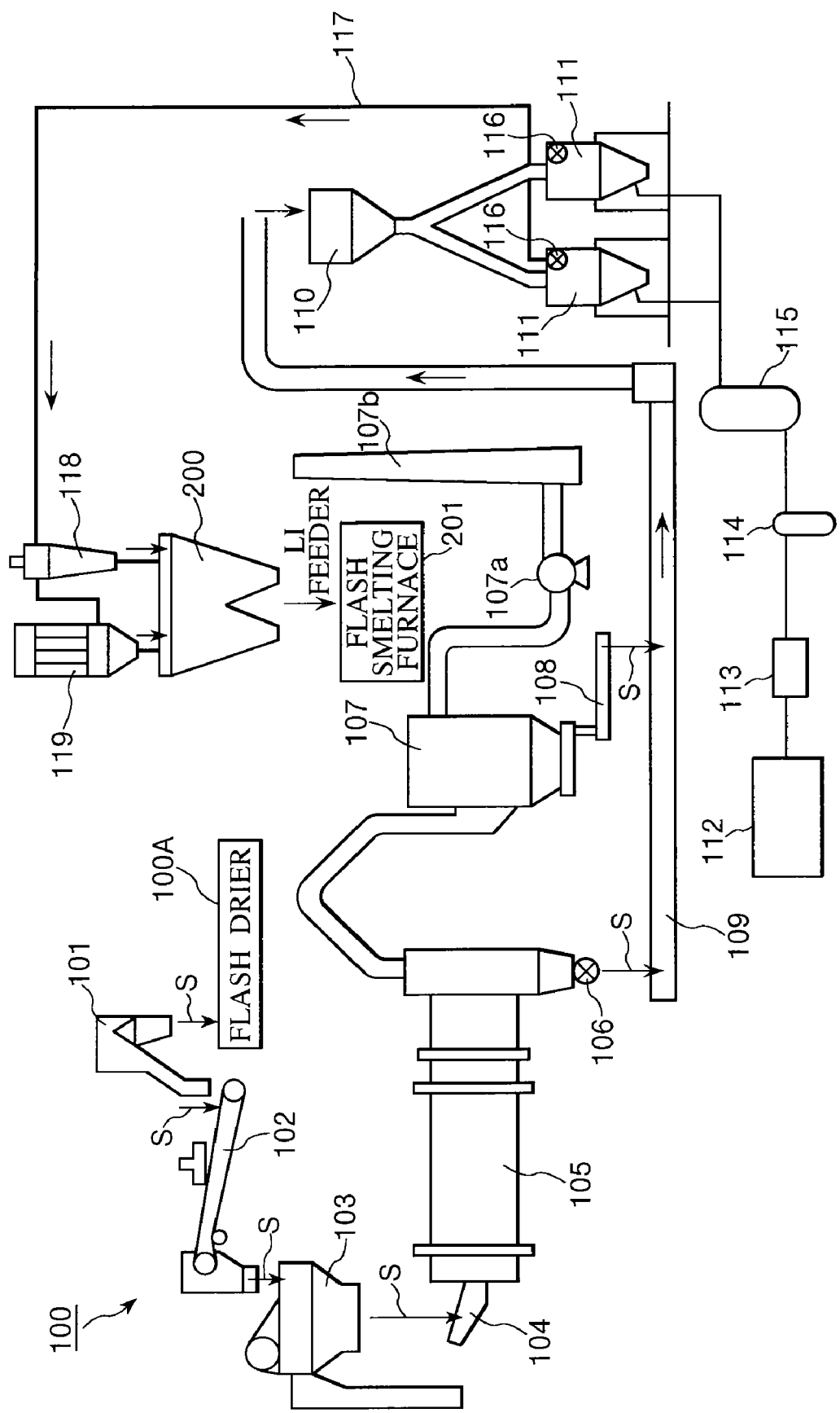
FIG. 1 is a schematic configuration view illustrating a part of a concentrate drying equipment in a copper refining plant.
Figure 2:
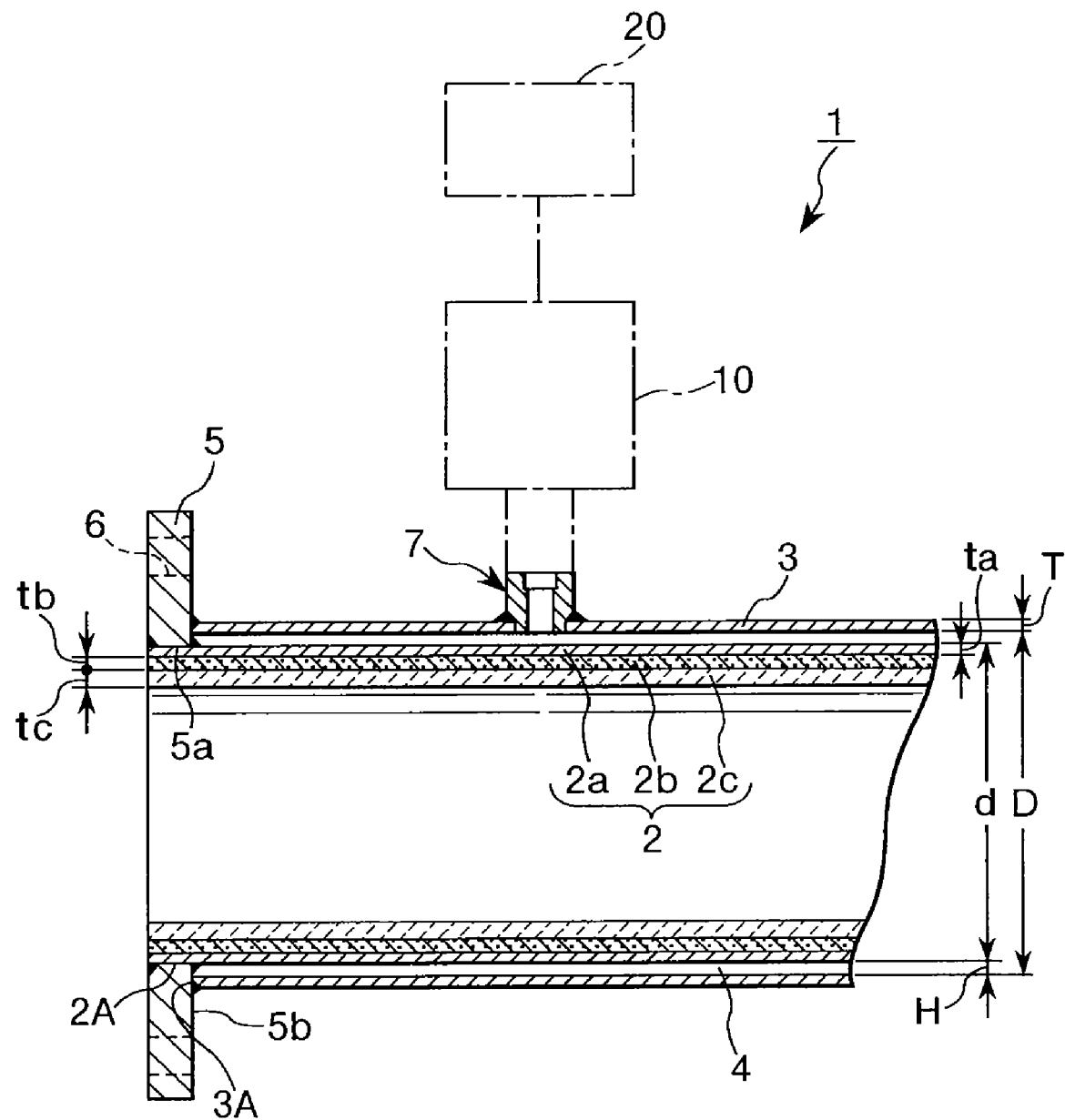
FIG. 2 is a longitudinal sectional view illustrating the configuration of the transfer pipe of the present invention.
Figure 3:
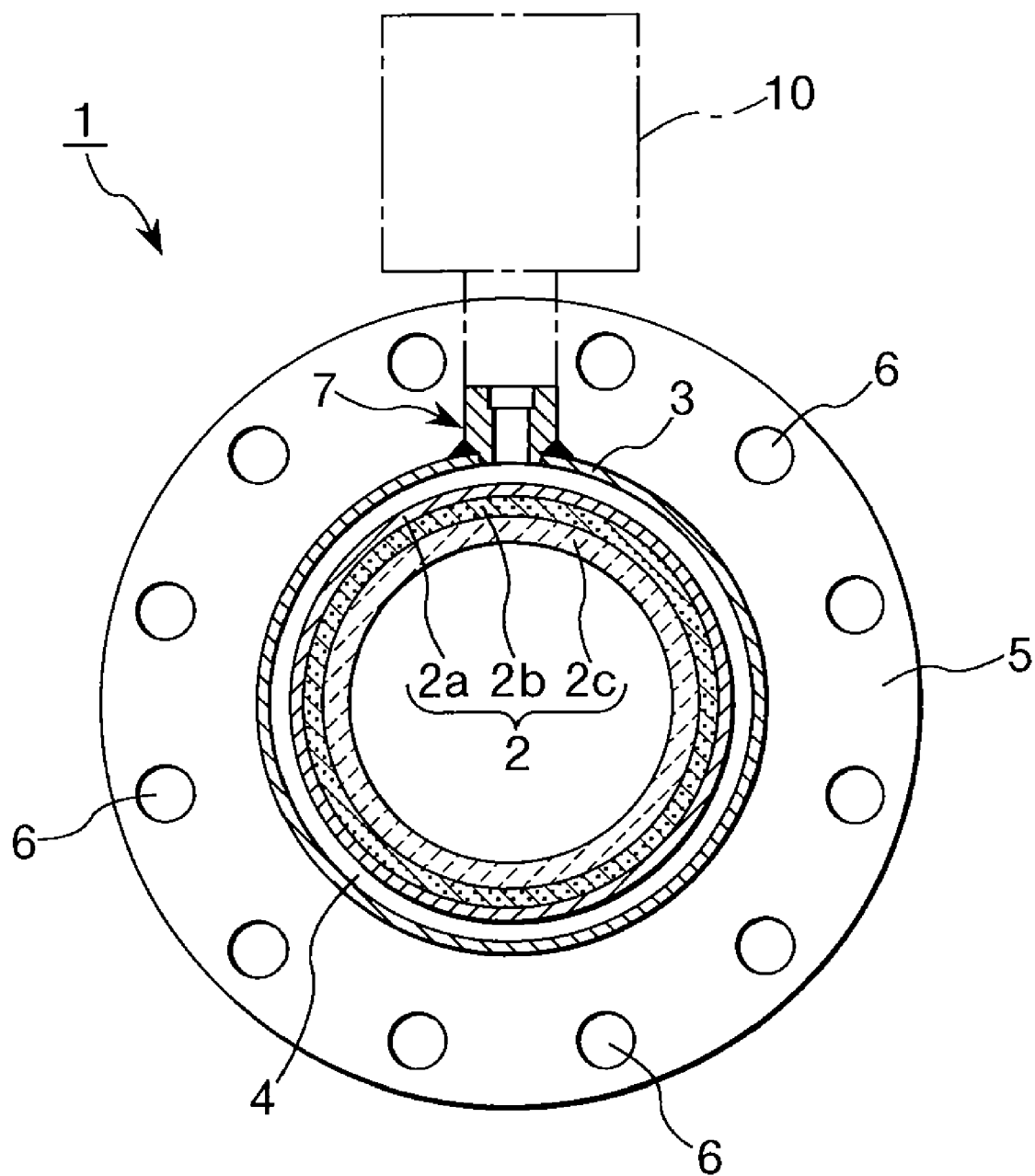
FIG. 3 is a cross-sectional view illustrating the configuration of the transfer pipe of the present invention.

FIGS. 2 and 3 illustrate an embodiment of the transfer pipe 1 of dried concentrate of the present invention. The transfer pipe 1 of the present invention can be used as a transfer pipe 117 in a concentrate drying facility 100 on the steam drier side described above with reference to FIG. 1.

Therefore, according to this embodiment, in the steam drier side dried concentrate drying equipment 100, the concentrate S dried at the steam drier 105 is transferred from the lift tank 111 to the dust chamber 118 by compressed air (0.4 MPa) through the transfer pipe at a flow velocity of 4 to 22 m/sec. The fluid containing the concentrate S is at a high temperature as 95 to 100° C.

The concentrate S is copper concentrate having a particle diameter (average particle diameter) of 42 μm.

In this embodiment, the transfer pipe 1 has a double pipe structure comprising an inner pipe 2 transferring the dried concentrate under pressure and an outer pipe 3 arranged around the outer periphery of the inner pipe 2. An annular space 4 serving as an air layer is formed between the inner pipe 2 and the outer pipe 3.

The inner pipe 2 has a metal pipe 2a such as a steel pipe or a stainless steel pipe forming the outermost layer in the diameter direction of the inner pipe 2, a ceramic sleeve 2c forming the innermost layer in the diameter direction, and a filler 2b filled between the metal pipe 2a and the ceramic sleeve 2c. For example, mortar cement or the like is suitably used as a filler 2b. As a ceramic sleeve 2c, for example, alumina ($Al_2O_3$: 92%) is applicable. The ceramic sleeve 2c serving as the innermost layer is provided for preventing wear caused by the dried concentrate. The filler 2b connects the ceramic sleeve 2c to the metal pipe 2a, and also plays a role of an insulating member.

The outer pipe 3 may be a metal pipe such as a steel pipe or a stainless steel pipe like the outermost layer metal pipe 2a of the inner pipe 2.

Usually, the outermost layer metal pipe 2a of the inner pipe 2 and the outer pipe 3 has a thickness (ta, T) of 5.0 and 5.3 mm, respectively, the outermost layer metal pipe 2a of the inner pipe 2 has an outside diameter d of 165.2 mm, and the outer pipe 3 has an inside diameter D of 180.2 mm. An annular space 4 having a distance H of 7.45 mm is formed between the outermost layer metal pipe 2a of the inner pipe 2 and the outer pipe 3.

Figure 4:
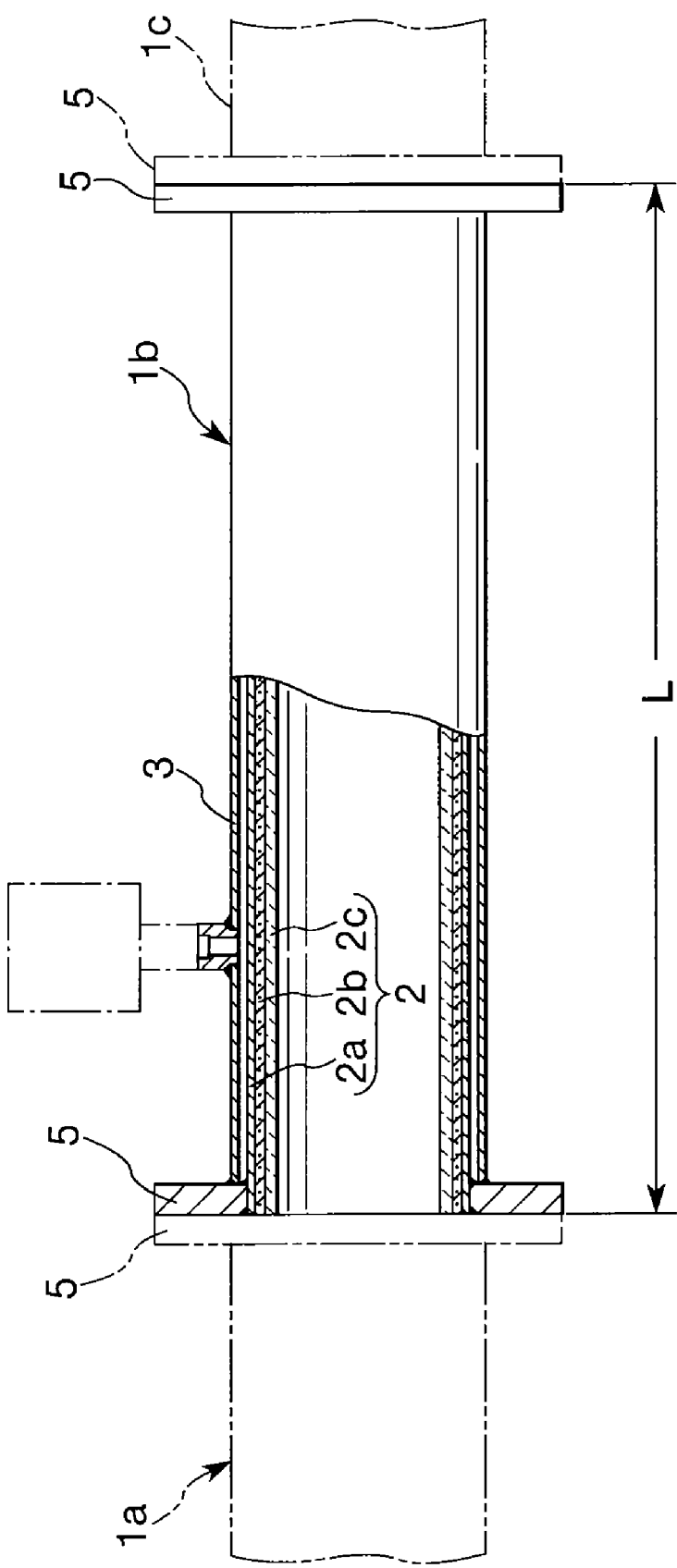
FIG. 4 is a view illustrating a state in which a plurality of transfer pipes are connected.

The ceramic sleeve 2c has a thickness (tc) of 10 mm. A thickness (tc) of the ceramic sleeve 2c smaller than 2 mm cannot be used because of the high risk of breakage. In this embodiment, annular joint flanges 5 having connecting bolt holes 6 formed on the outer periphery are arranged at both ends of the inner pipe 2 and the outer pipe 3, and the inner pipe 2 and the outer pipe 3 are integrally fixed at both ends by welding or the like. As shown in FIG. 4, a piping structure having a necessary length may be achieved by connecting a plurality of transfer pipes 1 (1a, 1b, 1c) by the utilization of this point flange 5. Depending upon the diameter of the transfer pipe 1, the transfer pipe 1 usually has a length (L) of 50 to 550 cm when the outer pipe 3 has a diameter (D+2 T) of 19 cm.

More specifically, joint flanges 5 are arranged at both ends of the inner pipe 2 as shown in FIGS. 2 and 4. Since, in this embodiment, both ends of the inner pipe 2 have the same shapes, only an end is shown in FIG. 2.

The outer peripheral surfaces of both ends of the inner pipe 2, i.e., the outer peripheral surfaces 2A of the outermost layer metal pipe 2a engage with the inside diameter part 5a of the joint flange 5, and the outer peripheral surfaces 2A of the inner pipe 2 are welded together with the joint flange 5a for integral fixing.

On the other hand, the end faces 3A of both ends are brought into butt contact with the side surface 5b of the joint flange 5 and welded together with the joint flange 5, thus ensuring integral fixing. Thus, a hollow annular portion, i.e., an annular space 4 having a prescribed gap H and which is a closed space is formed between the inner pipe 2 and the outer pipe 3.

A pressure detector attachment nozzle 7 is installed on the outer pipe 3 to attach a pressure detector 10 serving as pressure detecting means. The pressure detector 10 can detect pressure in the enclosed annular space 4 constantly, or periodically, or from time to time, and transmits the detected pressure signal to a controller 20 which is control means. This will be described further in detail later.

Figure 5:
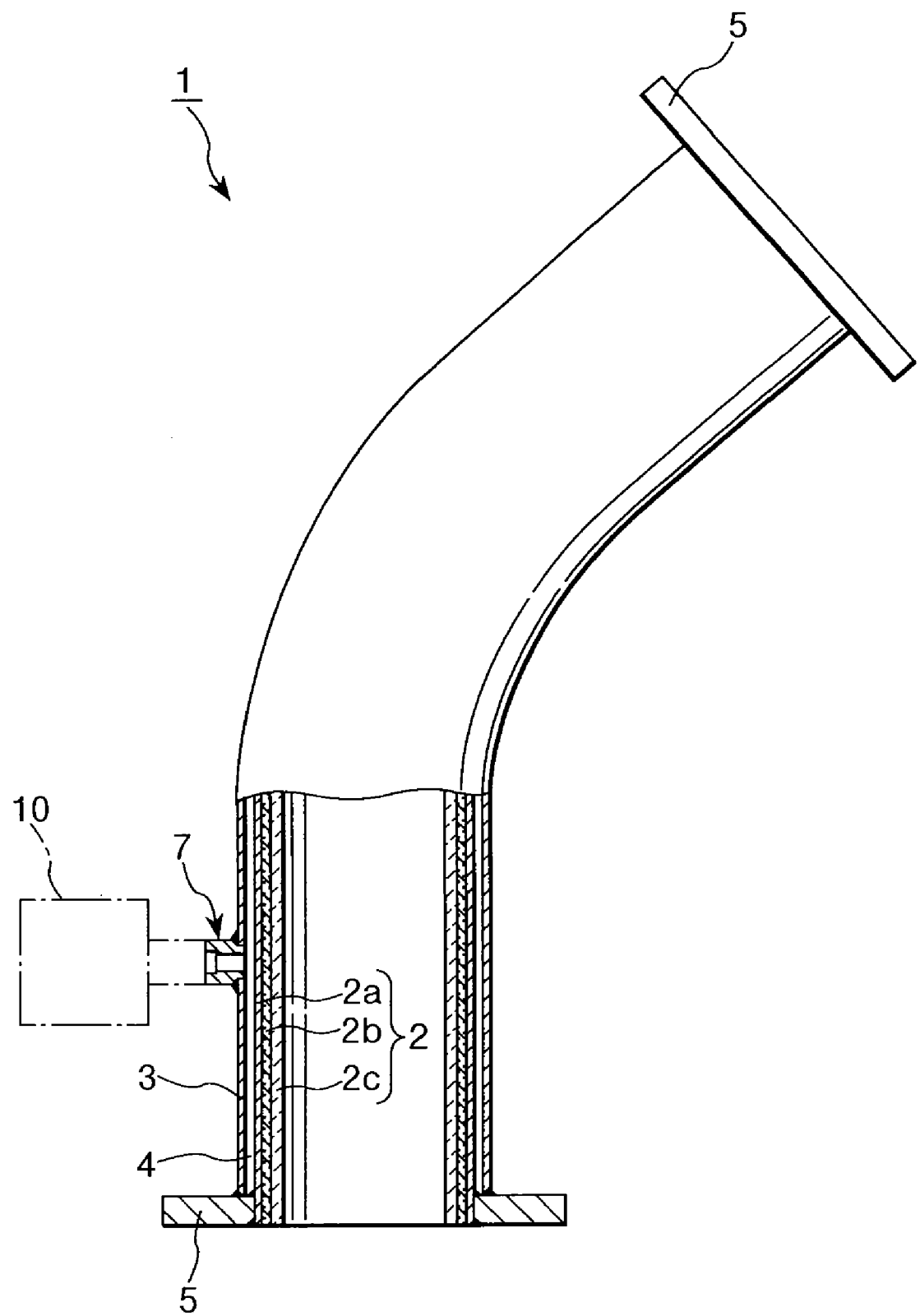
FIG. 5 is a cross-sectional view illustrating the configuration of the transfer pipe of the present invention which is a bending pipe.

The transfer pipe 1 of the present invention may be a straight pipe as shown in FIGS. 2 and 4, or may be as bending pipe as shown in FIG. 5. Since the bending pipe of this embodiment has the same configuration as the straight pipe shown in FIG. 2, the same reference numerals are assigned to the members having the same functions, and the description thereof is omitted here. The wear resistance which is a feature of the present invention is effectively utilized particularly in such a bending pipe.

According to the result of experimental research carried out by the present inventors, use of the transfer pipe 1 having the above-mentioned structure remarkably reduced the wear of the transfer pipe since surface wear caused by dried concentrate transferred by compressed air, thus largely improving wear resistance (i.e., durability) as compared with that available in the conventional art.

According to the present invention, as described above, a pressure detector 10 is attached to the pressure detector nozzle 7 in the transfer pipe 1. The annular space 4 thus serves as a simple air layer.

When the inner pipe 2 of the transfer pipe 1 is broken, the pressure in the annular space 4 increases, and a pressure value is detected by the pressure detector 10. The signal from the pressure detector 10 is transmitted to the controller 20. In this embodiment, the pressure detector 10 detects an increase in the pressure within the annular space 4, and when the first prescribed pressure value is reached, the controller 20 issues an alarm. Furthermore, when the pressure detector 10 detects an increase in the pressure in the annular space 4 to a second prescribed pressure value, the controller 20 automatically discontinues transfer of concentrate in response to a signal from the pressure detector 10.

In this embodiment, compressed air has a pressure of 0.4 MPa. When the inner pipe 2 is broken, the pressure in the annular space 4 naturally exceeds 9.0 kPa. Therefore, the controller 20 issues an alarm when the first prescribed pressure value in the annular space 4 reaches 9.0 kPa, and when the second prescribed pressure value becomes 9.5 kPa, the controller 20 automatically discontinues transfer of concentrate.

In the configuration described above, it is possible to prevent spouting of the piping due to wear caused by dried concentrate. For example, when there occurs spouting as a result of pitting in the inner pipe, an alarm is issued to draw attention, and when the prescribed pressure value becomes further higher, transfer of concentrate is automatically discontinued. It is therefore possible to prevent that even the outer pipe is broken by wear, resulting splashing of concentrate to outside, thus causing pollution of the environments.

What is claimed is:

1. A method of transferring a granular or powdery dried copper concentrate from a lift tank to a furnace in a smelting process, the method comprising:
providing a piping structure comprising a plurality of connected transfer pipes in straight and bent forms, each transfer pipe having a double pipe structure comprising an inner pipe through which the dried copper concentrate is transferred, an outer pipe arranged around an outer periphery of the inner pipe, and at least one joint flange arranged at each end of the inner pipe and of the outer pipe, the joint flanges welded to the inner pipe and the outer pipe to integrally fix the inner pipe and the outer pipe and form an annular space sealed between the inner pipe and the outer pipe, wherein the inner and outer pipes are made of metal, a ceramic sleeve forms an innermost layer of said inner pipe, and a filler is provided between the inner pipe and the ceramic sleeve to fix the ceramic sleeve to the inner pipe;
charging the dried copper concentrate to the lift tank;
feeding compressed air to the lift tank;
conveying the dried copper concentrate from the lift tank to a dust chamber through the inner pipes of the transfer pipes with the compressed air at a flow velocity of 4 to 22 meters per second and at a temperature of 95 to 100° C.;
measuring the pressure within the annular space constantly or periodically during the conveying by a pressure detector connected to the outer pipe;
transmitting a pressure signal representative of a measured pressure value from the pressure detector to a controller;
issuing an alarm from the controller when the measured pressure value in the annular space reaches a first prescribed pressure value representing a break in the inner pipe;
discontinuing the conveying of the dried copper concentrate when the measured pressure value in the annular space reaches a second prescribed pressure value greater than the first prescribed pressure value; and
feeding the dried copper concentrate from the dust chamber to a flash smelting furnace.

2. A method of transferring a granular or powdery dried copper concentrate according to claim 1, wherein the compressed air has a pressure of 0.4 MPa, the first prescribed pressure value in the annular space is 9.0 kPa, and the second prescribed pressure value in the annular space is 9.5 kPa.

* * * * *